United States Patent
Murtagh et al.

(10) Patent No.: US 7,801,539 B2
(45) Date of Patent: Sep. 21, 2010

(54) SMS MESSAGING

(75) Inventors: John Murtagh, Dublin (IE); Louis Corrigan, Enfield (IE)

(73) Assignee: Markport Limited, Dublin (IE)

( * ) Notice: Subject to any disclaimer, the term of this patent is extended or adjusted under 35 U.S.C. 154(b) by 1528 days.

(21) Appl. No.: 10/696,553

(22) Filed: Oct. 30, 2003

(65) Prior Publication Data
US 2004/0133623 A1    Jul. 8, 2004

Related U.S. Application Data

(63) Continuation of application No. PCT/IE02/00062, filed on May 3, 2002.

(60) Provisional application No. 60/288,095, filed on May 3, 2001, provisional application No. 60/301,455, filed on Jun. 29, 2001.

(30) Foreign Application Priority Data
Jul. 2, 2001 (EP) .................................. 01650077

(51) Int. Cl.
H04W 4/00 (2009.01)
H04M 3/42 (2006.01)
(52) U.S. Cl. .................................. 455/466; 455/414.1
(58) Field of Classification Search ................. 455/413, 455/426, 414, 466; 370/338; 709/200
See application file for complete search history.

(56) References Cited

U.S. PATENT DOCUMENTS

| | | | | |
|---|---|---|---|---|
| 6,230,005 B1* | 5/2001 | Le et al. | .................. | 455/414.1 |
| 6,298,232 B1* | 10/2001 | Marin et al. | ................. | 455/413 |
| 6,570,860 B2* | 5/2003 | Hamalainen et al. | ........ | 370/329 |
| 6,587,691 B1* | 7/2003 | Granstam et al. | ........ | 455/456.1 |
| 6,608,832 B2* | 8/2003 | Forslow | ....................... | 370/353 |
| 6,735,187 B1* | 5/2004 | Helander et al. | ............ | 370/338 |
| 6,856,808 B1* | 2/2005 | Comer et al. | ............... | 455/466 |
| 2002/0077786 A1* | 6/2002 | Vogel et al. | ................. | 702/188 |
| 2003/0069031 A1* | 4/2003 | Smith et al. | ................. | 455/466 |

FOREIGN PATENT DOCUMENTS

| | | |
|---|---|---|
| WO | WO99/16266 | 4/1999 |
| WO | WO00/19742 | 4/2000 |
| WO | WO00/42790 | 7/2000 |
| WO | WO00/48365 | 8/2000 |
| WO | WO01/22752 | 3/2001 |

* cited by examiner

*Primary Examiner*—George Eng
*Assistant Examiner*—Michael Faragalla
(74) *Attorney, Agent, or Firm*—Jacobson Holman PLLC

(57) ABSTRACT

A virtual mobile node (22) has a pseudo HLR (23) and a pseudo MSC (24). It transfers an SMS message between an entity in a foreign mobile network having a different technology to an SMS entity connected to the local network. The pseudo HLR and MSC are both located in the home network but operate with the protocol of the foreign network. Thus, communication between the home and foreign networks is via SS7 signalling.

18 Claims, 4 Drawing Sheets

Messages from a GSM subscriber are forwarded to the CMDA Operators SMSC

SMS MESSAGING

This is a continuation of PCT/IE02/00062 filed May 3, 2002 and published in English which in turn is based on provisional Application No. 60/288,095 filed May 3, 2001 and provisional Application No. 60/301,455 filed Jun. 29, 2001.

FIELD OF THE INVENTION

The invention relates to Short Message Services (SMS), both for person-to-person messaging and for person-to-application server messaging for two-way SMS services.

PRIOR ART DISCUSSION

At present, many network operators are only in position to offer SMS services to users who access a mobile network using the same technology as the network operator. SMS Services includes both person-to-person messaging, application server-to-person messaging and person-to-application server messaging; that is there is always a mobile device involved. For example, a CDMA operator can only offer SMS services to his own subscribers or subscribers of other CDMA network operators. The CDMA operator cannot offer these services to subscribers of GSM networks.

The invention addresses this problem.

SUMMARY OF THE INVENTION

According to the invention, there is provided a mobile network node comprising means for interfacing with an entity of a local network in which the node is located and with an entity of a foreign network having a non-compatible protocol for communication of short messages between the networks, characterised in that, the node comprises a pseudo network element operating with the protocol of the foreign network and comprising means for communicating with an actual element of the foreign network.

In one embodiment, the pseudo network element is a pseudo HLR.

In another embodiment, the node further comprises a pseudo MSC operating with the protocol of the foreign network and being connected to the pseudo HLR.

In a further embodiment, the node comprises means for interfacing with a short message interworking gateway in the home network for bi-directional transfer of short messages.

In one embodiment, said interfacing means comprises a pseudo SMSC operating with the protocol of the foreign network.

In another embodiment, the pseudo network element comprises means for communicating with the foreign network actual element via a signalling network.

In a further embodiment, the signalling network is an SS7 network.

In another aspect, the invention provides a mobile network node for operating in a home mobile network, the node comprising:

a pseudo HLR comprising means for operating with the protocol of a foreign network, said pseudo HLR comprising means for receiving a short message from an SMSC of the foreign network;

a pseudo MSC comprising means for operating with the protocol of the foreign network, and for receiving a short message from the pseudo HLR;

means for routing the short message from the pseudo MSC to an SMSC of the home network.

In one embodiment, the pseudo MSC comprises means for terminating the message vis-à-vis the foreign network.

In another embodiment, the routing means comprises means for interfacing with a home network SMSC interworking gateway.

In a further embodiment, said interfacing means comprises an SMSC operating with the protocol of the foreign network.

According to a further aspect, the invention provides a method of delivery of a short message from a foreign network to a user or an application server in a home network, the foreign network operating with a protocol which is different from that of the home network, the method comprising the steps of:

an SMSC of the foreign network routing the message to a pseudo HLR in the home network, the pseudo HLR operating with the protocol of the foreign network;

routing the message to a pseudo MSC in the home network, the pseudo MSC operating with the protocol of the foreign network;

routing the message to an SMSC of the home network using an SMSC access protocol;

the home network SMSC routing the message to the destination user or application server.

In one embodiment, the message is routed to the home network SMSC by a pseudo SMSC located in the home network and operating with the protocol of the foreign network.

In another embodiment, the pseudo SMSC transmits the message to an interworking gateway, which performs protocol conversion and routes the message to the home network SMSC.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
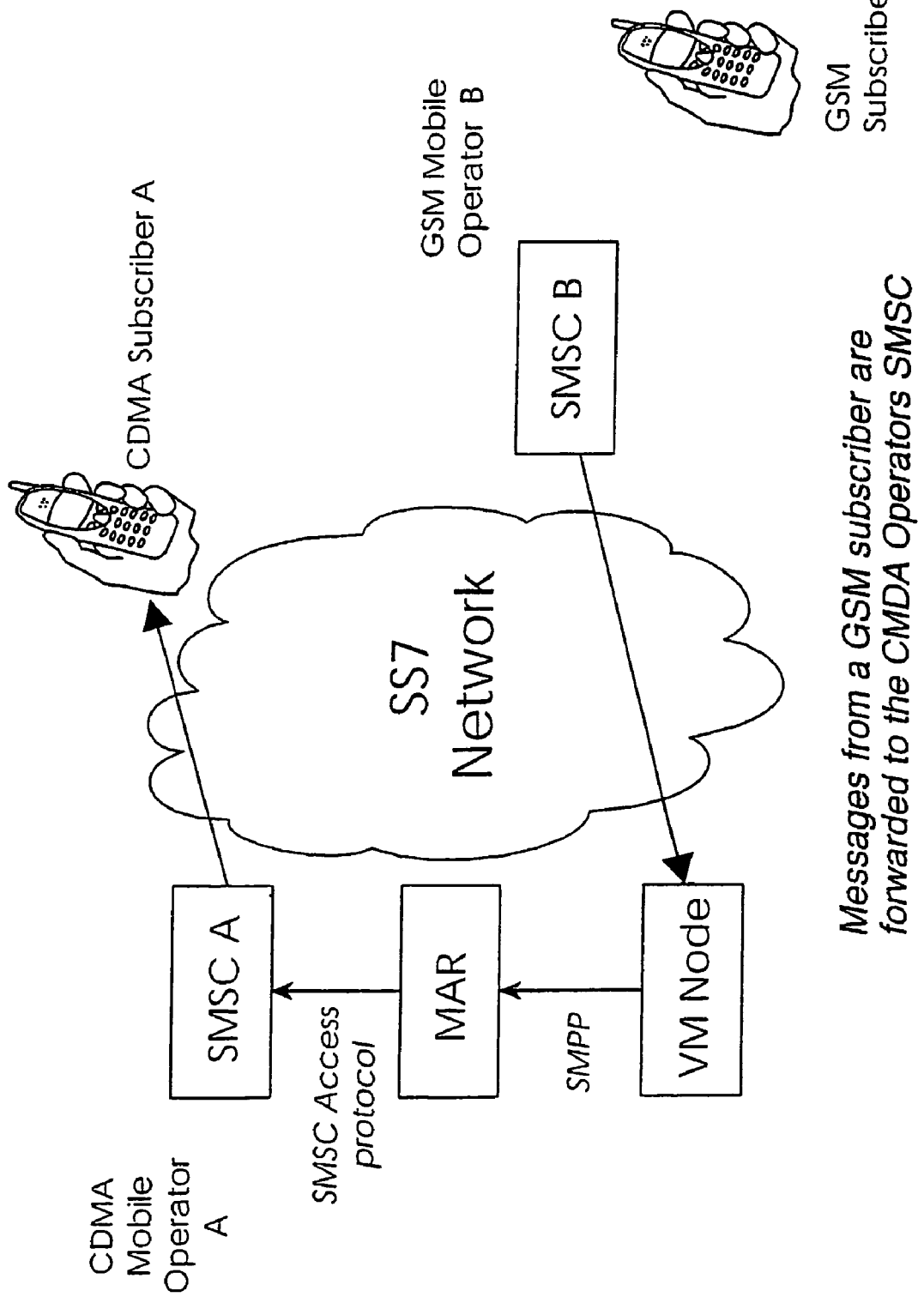
FIGS. 1 and 2 are flow diagrams illustrating inter-technology message transfer between networks (deploying different wireless technologies) for SMS services.

Referring to FIG. 1, a virtual mobile node (VM), deployed in CDMA Operator A's network, receives an SMS message from an SMSC B of a GSM network B over SS7 protocols. The message is destined to a person who is a subscriber of CDMA operator A and is thus equipped with a CDMA mobile station.

The VM node forwards the message to the Operator A's SMSC over an internal IP network. In the example the VM node uses SMPP to transfer the message via a message application router (MAR) as an intermediary gateway. This procedure allows CDMA network operator A to offer an SMS service where its subscribers can receive messages from other mobile users equipped with "different technology" handsets. The interconnect to the foreign network is SS7-based.

Figure 2:
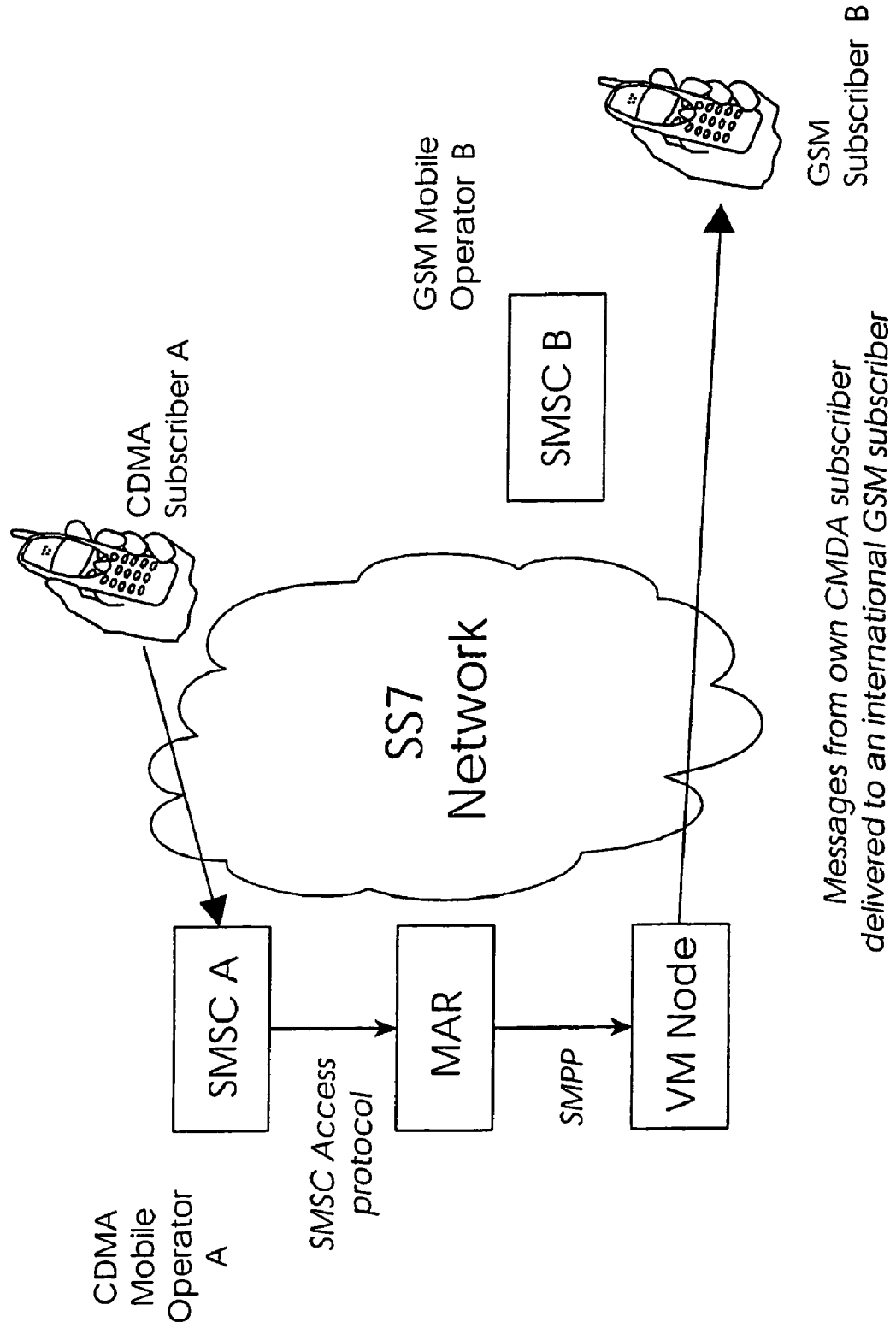

The reverse direction is shown in FIG. 2. In this case, the operator's own subscriber sends an SMS message to a GSM user of network B. The message can be sent either autonomously or as a reply to a received message from the GSM user. Subscriber A originates the message as normal, thus causing the SMS to be stored in his home SMSC A. The SMSC A determines that the destination address is not a CDMA mobile and forwards the SMS to the MAR interworking gateway over an IP or X.25 based protocol (e.g. UCP, SMPP). The MAR forwards the message to the VM node which is acting in the mode of an SMSC. The VM node determines that the destination is a GSM mobile and delivers the message over SS7 using GSM MAP and GSM 03.40 protocols to GSM user B.

Figure 3:
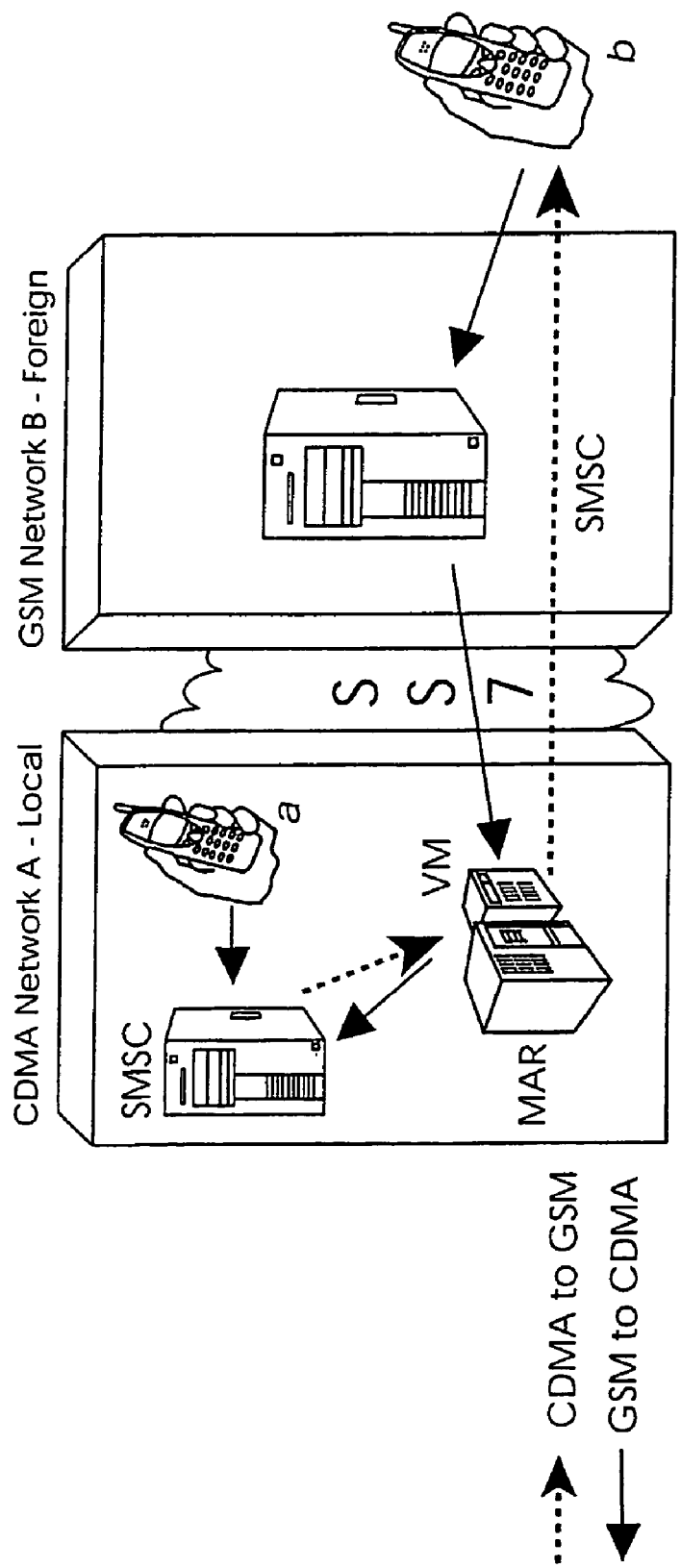
FIG. 3 is a diagram illustrating deployment of a virtual mobile node.

The deployment is shown in FIG. 3. The VM node presents GSM HLR and MSC functions in operator A's network to the GSM network B. These are referred to as a pseudo HLR and a pseudo MSC. This means that they operate with the foreign network's technology (protocol) but are entities of the home network. Because they operate with the foreign network's protocol they can communicate with it via SS7.

In the other direction the VM provides a GSM Gateway MSC function for a mobile terminating (MT) SMS to an international GSM user in the foreign network.

GSM Network to Hosting TDMA, CDMA or PDC Network

In more detail, the procedures involved for message transfer from a GSM network to a hosting TDMA, CDMA or PDC network are:

1. Querying a pseudo GSM HLR to determine the serving MSC and the IMSI.
2. Sending the message to the pseudo GSM MSC, using the address information from action 1 to address GSM pseudo MSC.
3. Routing and Sending the message over an SMSC access protocol (e.g. SMPP) for transfer to the home SMSC. In performing this step, the VM operates as an SMSC in the home network, but using the foreign technology. Thus, the VM has three network entities, namely a HLR, an MSC, and an SMSC. All three operate with the foreign network technology, but are located in the home network.

Figure 4:
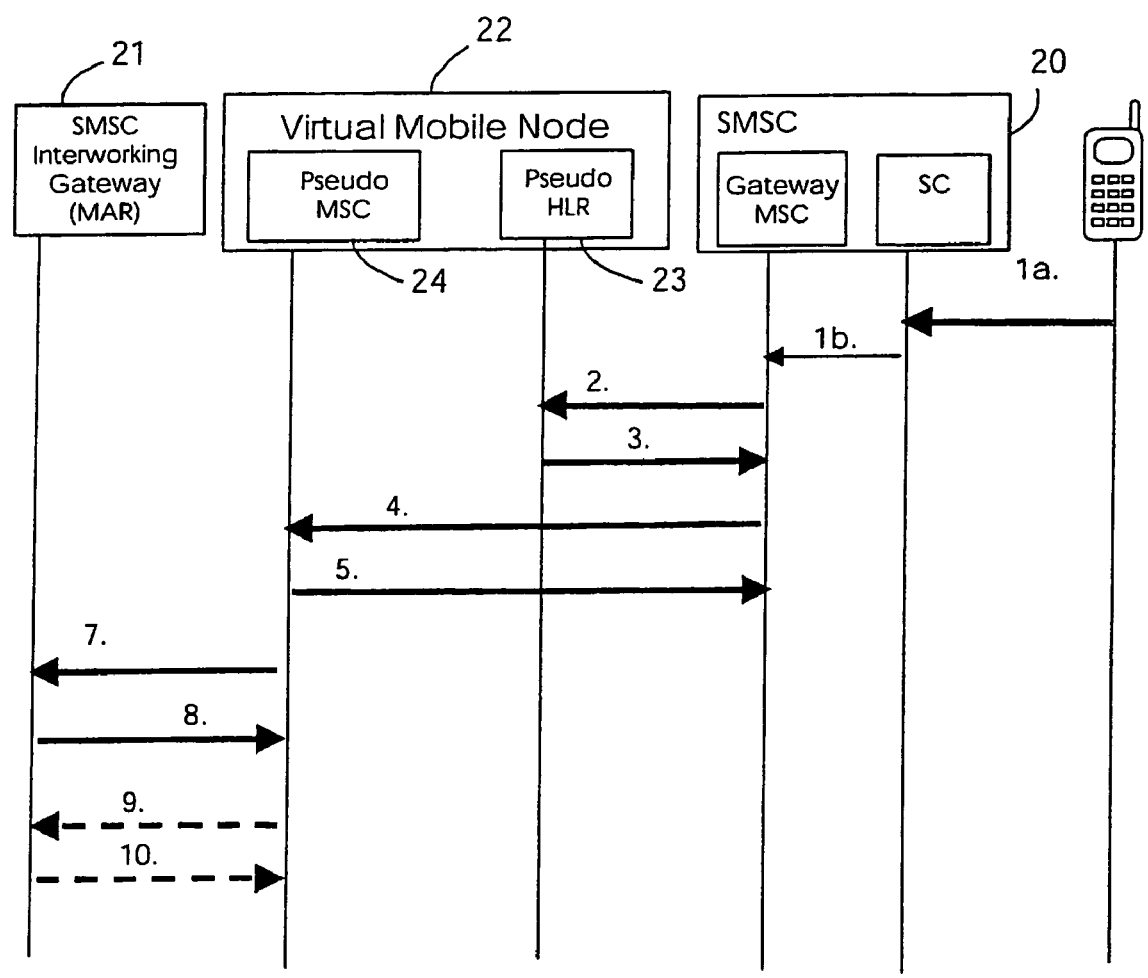
FIG. 4 is a signal transfer diagram.

Referring to FIG. 4 the foreign (GSM) SMSC is indicated by 20, the VM node by 22, and the MAR by 21. Within the VM node 22 there is a pseudo HLR 23 and a pseudo MSC 24

The node 22 acts as a pseudo GSM HLR, that will return the recipient (virtual) mobile number in the IMSI and optionally the serving MSC address parameter in the response signal (SRI-SM response). The node 22 also acts as a pseudo GSM MSC to accept the mobile terminated short message and, retrieving the original (virtual) mobile number digits from the IMSI and serving MSC address parameters. The node 22 acts as a pseudo SMSC and forwards the message to the SMSC interworking gateway 21 for transfer to the home SMSC.

The node 22 accepts a Short Message being delivered by another GSM SMSC. This requires the following:

Support for GSM MAP Forward Short Message (GSM) operation for message termination.
Support for reception of GSM 03.40 SMS-DELIVER Transfer Layer PDU
Modified parameter and error handling.
Appropriate message validation, address translation and onward routing As shown in FIG. 4, the virtual mobile node 22 interfaces with a foreign SMSC 20 and with a home interworking gateway 21. It terminates the message delivery from a foreign GSM SMSC and forwards it to the SMSC interworking gateway 21.

The following are the signals:

1a) MO Short Message (GSM 03.40) from MS user to foreign SMSC. Message is addressed to MSISDN assigned to recipient.
1b) Internal SMSC request to deliver the SMS message.
2) MAP_SEND_ROUTING_INFO_FOR_SM (msisdn="recipient MSISDN")
3) MAP_SEND_ROUTING_INFO_FOR_SM_ACK. The location information (network_number) is the GT network address of the virtual mobile node. A virtual IMSI is also returned—it's digits are a function of the original MSISDN.
4) MAP_MT_FORWARD_SHORT_MESSAGE. IMSI and network address are included.
5) MAP_MT_FORWARD_SHORT_MESSAGE_ACK
6) void
7) Delivery to SMSC interworking gateway (e.g. SMPP SM_DELIVER)
8) Delivery Acknowledgement from SMSC interworking gateway (e.g. SMPP SM_DELIVER_resp)
9) In case of delivery failure at step 7 due to a temporary condition, a subsequent retry of delivery to SMSC interworking gateway (e.g. SMPP SM_DELIVER).
10) Delivery Acknowledgement from SMSC Interworking Gateway (e.g. SMPP SM_DELIVER_resp)

Routing Information Enquiry

The following are the signals and features.

SendRoutingInfoForSM requests may be received by the virtual mobile node (using HLR SSN corresponding number).
Support for v1, v2 and v3 of SRI-SM.
A response is returned by the virtual mobile node, with a pre-defined MSC number and IMSI or LMSI generated according to the MSISDN.
A limited range of errors is supported including unidentified subscriber, system failure, unexpected data value, and data missing.

SMS Forwarding

The following are the signals and features.

Mobile Terminated Forward Short Message is received by the virtual mobile node (using MSC corresponding number).
Reconstruction of the original destination number from the IMSI and (if necessary) the MSC address parameters.
Virtual Mobile will decode the MT-FSM payload as SMS-DELIVER PDU rather than SMS-SUBMIT PDU
In a manner identical to SMSC message validation, address translation and message routing can be performed
Support for v1, v2 and v3 of MT-FSM
A limited range of errors is supported, including unidentified subscriber, system failure, unexpected data value, data missing, illegal subscriber, facility not supported, and SM delivery failure
SMS message is routed using the destination number over SMPP (or other proprietary SMSC access protocol) to the SMSC interworking gateway which forwards it to the home SMSC. The home SMSC uses standard ANSI-41 procedures (in the case of TDMA and CDMA networks) or ISUP procedures (in the case of PDC networks) to deliver the message to the recipient mobile.

TDMA or CDMA to Hosting GSM, TDMA, CDMA or PDC Network

The procedures involved for message transfer from a TDMA or CDMA network to a hosting GSM, TDMA, CDMA or PDC network are:

1. Querying a pseudo ANSI-41 HLR to determine the serving MSC and the MIN (in the case of MIN been different from directory number).

2. Sending the message to the pseudo ANSI-41 MSC 24, using the address information from action 1 to address pseudo ANSI-41 MSC.
3. Routing and sending the message over an SMSC access protocol (e.g. SMPP) for transfer to the home SMSC.

The node 22 acts as a pseudo ANSI-41 HLR, that will return the recipient (virtual) mobile number in the MIN and optionally the serving MSC Address parameter in the response signal (SMSREQ response). The node 22 acts as a pseudo ANSI-41 MSC to accept the mobile terminated short message and, retrieving the original (virtual) mobile number digits from the MIN and Serving MSC Address parameters. The node 22 acts an SMSC and forwards the message to the SMSC interworking gateway 21 for transfer to the home SMSC.

The node accepts a short message being delivered by another ANSI-41 SMSC. This requires the following:
   Support for ANSI-41 Short Message Delivery Peer-to-Peer (SMDPP) MAP operation in mobile terminated direction.
   Support for reception of TDMA (IS-136) and CDMA (IS-637) SMS-DELIVER Teleservice Layer PDU.
   Modified parameter and error handling.
   Appropriate message validation, address translation and onward routing.

As shown in FIG. 4, the virtual mobile node 22 emulates an ANSI-41 MSC and an ANSI-41 HLR, terminates the message delivery from a foreign ANSI-41 SMSC and forwards it to the SMSC interworking gateway 21.

The following are the signals:
1a) MO Short Message (SMS-SUBMIT) from CDMA/TDMA MS user to foreign SMSC. Message is addressed to mobile directory number (MDN or MSISDN) assigned to recipient.
1b) Internal SMSC request to deliver the SMS message.
2) SMSREQ INVOKE (mdn="destination directory number")
3) SMSREQ RETURN RESULT. The location information (SMS Address) is the SS7 network address of the virtual mobile node. An MIN number is also returned—it's digits are a function of the original directory number.
4) SMDPP Invoke. MIN and MSC network address are included.
5) SMDPP RETURN RESULT.
6) void
7) Delivery to SMSC Interworking Gateway (e.g. SMPP SM_DELIVER)
8) Delivery Acknowledgement from SMSC Interworking Gateway (e.g. SMPP SM_DELIVER_resp)
9) In case of delivery failure at step 7 due to a temporary condition, a subsequent retry of Delivery to SMSC Interworking Gateway (e.g. SMPP SM_DELIVER).
10) Delivery Acknowledgement from SMSC Interworking Gateway (e.g. SMPP SM_DELIVER_resp)

Routing Information Enquiry
   The following are the signals and features.
   SMSREQ requests may be received by the virtual mobile (using HLR SSN correspondingly Number).
   Support for Rev C, D and E of ANSI-41 SMSREQ.
   A response is returned by the Virtual Mobile, with a predefined MSC number and MIN generated according to the directory number (an appropriate algorithm is provisioned on the Virtual Mobile Node).
   A limited range of errors is supported, including "Invalid", and "Denied".

SMS Forwarding
   The following are the signals and features.
   Mobile Terminated SMDPP is received by the virtual mobile (using MSC corresponding number).
   Reconstruction of the original destination number from the MIN and (if necessary) the MSC address parameters.
   Virtual mobile will decode the SMDPP payload (bearer data) as SMS-DELIVER PDU rather than SMS-SUBMIT PDU.
   In a manner similar to SMSC message validation, address translation and message routing can be performed.
   Support for Rev C, D and E of SMDPP.
   A limited range of errors (SMS Cause Codes) are supported, as follows:
      "Address Vacant"
      "Address translation failure"
      "Network Resource Shortage"
      "Network Failure"
      "Invalid Teleservice Id"
      "Destination out of Service"
      "Encoding Problem"
      "SMS Termination Denied"
      "Missing Expected Parameter"
      "Missing Mandatory Parameter"
      "Unrecognised Parameter Value"
      "Unexpected Parameter Value"
      "User Data Size Error"
   SMS message is routed using the destination number over SMPP (or other proprietary SMSC access protocol) to the SMSC interworking gateway which forwards it to the home SMSC. The home SMSC uses standard ANSI-41 procedures (in the case of different TDMA or CDMA network) or GSM MAP procedures (in case of GSM network) or ISUP procedures (in the case of PDC networks) to deliver the message to the recipient mobile.

It will be appreciated that the invention provides a method for a TDMA operator to receive an SMS from a foreign GSM network and forward it to an SMSC for delivery to a local TDMA subscriber, for example. Other examples of uses are that it provides the following:
   a method for a TDMA operator to receive an SMS from a foreign CDMA network and forward it to an SMSC for delivery to a local TDMA subscriber,
   a method for a CDMA operator to receive an SMS from a foreign GSM network and forward it to an SMSC for delivery to a local CDMA subscriber,
   a method for a CDMA operator to receive an SMS from a foreign TDMA network and forward it to an SMSC for delivery to a local CDMA subscriber,
   a method for a GSM operator to receive an SMS from a foreign TDMA network and forwarding it to an SMSC for delivery to a local GSM subscriber,
   a method for a GSM operator to receive an SMS from a foreign CDMA network and forwarding it to an SMSC for delivery to a local GSM subscriber, and
   a computer based method for receiving an SMS from a foreign SMSC as a mobile terminated delivery; examining the destination number and forwarding it over an IP-based SMSC access protocol to an adjacent node in the operators network. The adjacent node can be an SMSC, or an SMSC interworking gateway or an SMS application server.

Of course, the invention also allows routing to/from application servers which host SMS-initiated services.

The invention is not limited to the embodiments described but may be varied in construction and detail.

The invention claimed is:

1. A method for delivering a short message from a foreign mobile network to a user or application server in a home mobile network, the home and foreign networks operating with non-compatible protocols, the method comprising the steps of:
   an SMSC of the foreign network querying a pseudo HLR in the home network, said pseudo HLR operating with the protocol of the foreign network, to determine a serving MSC;
   the pseudo HLR providing to the foreign network SMSC an address of a pseudo MSC in the home network, said pseudo MSC operating with the protocol of the foreign network;
   the foreign network SMSC routing the message to the pseudo MSC, wherein the pseudo MSC terminates the message delivery attempt by sending an acknowledgement to the foreign network SMSC;
   a mobile network node in the home network performing protocol conversion of the message to an access protocol and routing the message using said access protocol to a receiving node in the home network;
   the receiving node is a home network SMSC and the method comprises the further step of the home network SMSC routing the message to a destination user or application server;
   the mobile network node operates as a pseudo SMSC adapted to operate with the protocol of the foreign network when communicating with the foreign network and with an access protocol when communicating with elements of the home network, and said pseudo SMSC sends the message to the home network SMSC using the access protocol; and
   the pseudo SMSC, in case of delivery failure due to a temporary condition, performs a retry of sending the message to the receiving node and receives a delivery acknowledgement.

2. The method as claimed in claim 1, wherein the receiving node is a home network SMSC and the method comprises the further step of the home network SMSC routing the message to a destination user or application server.

3. The method as claimed in claim 1, wherein the receiving node is an inter-working gateway, and said inter-working gateway routes the message to a home network SMSC and the home network SMSC routes the message to a destination user or application server.

4. The method as claimed in claim 1, wherein the receiving node is an SMS application server.

5. The method as claimed in claim 1, wherein the access protocol is SMPP.

6. The method as claimed in claim 1, wherein the pseudo HLR and the pseudo MSC communicate with the foreign network SMSC via a signalling network.

7. The method as claimed in claim 6, wherein the signalling network is an SS7 network.

8. The method as claimed in claim 1, wherein:
   the mobile network node operates as a pseudo SMSC adapted to operate with the protocol of the foreign network when communicating with the foreign network and with an access protocol when communicating with elements of the home network, and said pseudo SMSC sends the message to the receiving node using the access protocol; and
   the pseudo SMSC, in case of delivery failure due to a temporary condition, performs a retry of sending the message to the receiving node and receives a delivery acknowledgement.

9. A mobile network node adapted to deliver a short message from a foreign mobile network to a user or application server in a home mobile network, the home and foreign networks operating with non-compatible protocols, the mobile network node being adapted to reside in the home network and comprising a pseudo HLR operating with the protocol of the foreign network and a pseudo MSC operating with the protocol of the foreign network, and the mobile network node being adapted to perform the steps of:
   the pseudo HLR receiving from an SMSC of the foreign network a query to determine a serving MSC;
   the pseudo HLR providing to the foreign network SMSC an address of the pseudo MSC;
   the pseudo MSC receiving the message from the foreign network SMSC;
   the pseudo MSC terminating the message delivery attempt by sending an acknowledgement to the foreign network SMSC; and
   performing protocol conversion of the message to an access protocol and routing the message using said access protocol to a receiving node in the home network;
   the receiving node is an inter-working gateway, and said inter-working gateway routes the message to a home network SMSC and the home network SMSC routes the message to a destination user or application server;
   the mobile network node operates as a pseudo SMSC adapted to operate with the protocol of the foreign network when communicating with the foreign network and with an access protocol when communicating with elements of the home network, and said pseudo SMSC sends the message to the inter-working gateway using the access protocol; and
   the pseudo SMSC, in case of delivery failure due to a temporary condition, performs a retry of sending the message to the inter-working gateway and receives a delivery acknowledgement.

10. The mobile network node as claimed in claim 9, wherein the node is adapted to receive from a home network SMSC, via the access protocol, a message addressed to the foreign network, and for performing protocol conversion of the message and delivering it to a recipient in the foreign network.

11. The mobile network node as claimed in claim 9, wherein the mobile network node is adapted to route the message using said access protocol to a home network SMSC as the receiving node.

12. The mobile network node as claimed in claim 9, wherein the mobile network node is adapted to route the message using said access protocol to an inter-working gateway as the receiving node.

13. The mobile network node as claimed in claim 9, wherein the mobile network node is adapted to generate an error code including error codes indicating network resource shortage, destination out of service, message termination denied, and network failure.

14. The mobile network node as claimed in claim 9, wherein the mobile network node is adapted to perform address translation.

15. A mobile network node adapted to deliver a short message from a foreign mobile network to a user or application server in a home mobile network, the home and foreign networks operating with non-compatible protocols, the mobile network node being adapted to reside in the home network and comprising a pseudo HLR operating with the protocol of the foreign network and a pseudo MSC operating with the protocol of the foreign network, and the mobile network node being adapted to perform the steps of:

the pseudo HLR receiving from an SMSC of the foreign network a query to determine a serving MSC;

the pseudo HLR providing to the foreign network SMSC an address of the pseudo MSC;

the pseudo MSC receiving the message from the foreign network SMSC;

the pseudo MSC terminating the message delivery attempt by sending an acknowledgement to the foreign network SMSC; and performing protocol conversion to an access protocol and routing the message using said access protocol to a receiving node in the home network; and wherein the node is adapted to receive from a home network SMSC, via the access protocol, a message addressed to the foreign network, and for performing protocol conversion of the message and delivering it to a recipient in the foreign network;

wherein the mobile network node is adapted to generate an error code including error codes indicating network resource shortage, destination out of service, message termination denied, and network failure; and wherein the mobile network node is adapted to perform address translation.

16. The method as claimed in claim 1, wherein the access protocol is UCP.

17. The method as claimed in claim 16, wherein the access protocol is UCP over IP.

18. The method as claimed in claim 5, wherein the access protocol is SMPP over IP.

* * * * *